United States Patent Office 2,935,492
Patented May 3, 1960

2,935,492
PROCESS FOR CURING MATERIAL HAVING INTERNAL EPOXY GROUPS AND RESULTING PRODUCTS

Herbert A. Newey, Lafayette, Calif., assignor to Shell Oil Company, a corporation of Delaware No Drawing. Application April 30, 1956
Serial No. 581,292

9 Claims. (Cl. 260—47)

This invention relates to a process for curing and resinifying materials possessing a plurality of epoxy groups. More particularly, the invention relates to a process for curing materials possessing at least one epoxy group in an internal position using a special curing system, and to the resulting cured products.

Specifically, the invention provides a new process for curing and resinifying polyepoxide material possessing at least one internal epoxy group, i.e., at least one

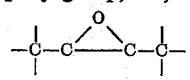

group, which comprises mixing and reacting the said material with a halo-substituted polybasic acid anhydride. The invention further provides cured products obtained by the above-described process which are characterized by their excellent hardness and flexibility.

It is known that materials having epoxy groups in a terminal position, i.e., materials possessing

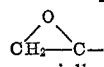

groups, such as the commercially available glycidyl polyethers, can be cured to form attractive products by reacting with alkaline materials, such as polyamines. Materials having internal epoxy groups, such as epoxidized soybean oil, are potentially cheaper materials than the compounds having the terminal epoxy groups and would be highly desirable replacements therefor for many applications. It has been found, however, that these materials are extremely difficult to cure due to the effect of having substituents on both carbon atoms in the epoxy group, and at best they form only very soft products which have no practical utility.

It is an object of the invention, therefore, to provide a new process for curing materials having internal epoxy groups. It is a further object to provide a new process for curing polyepoxides having internal epoxy groups using a special curing system. It is a further object to provide a new process for curing materials having internal epoxy groups which yield very hard products. It is a further object to provide a new process for curing epoxidized oils to form hard flexible castings in a very short period of time. It is a further object to provide cured epoxidized oils which are very hard and durable and have good flexibility. These and other objects of the invention will be apparent from the following detailed description thereof.

It has now been discovered that these and other objects are accomplished by the process of the invention comprising mixing and reacting polyepoxide material having at least one internal epoxy group with a halo-substituted polybasic acid anhydride, and preferably a polychlorinated polycarboxylic acid anhydride. It has been found that these special anhydrides have an unexpected action on the internal epoxy groups and cause a very rapid cure to form hard flexible castings. As shown in the working examples at the end of the specification, this was quite unexpected as treating of these materials with curing agents, such as polyamines, formed only very soft products.

The materials to be cured by the process of the invention comprise polyepoxide materials having at least one internal epoxy group, i.e., a

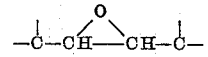

group. The other epoxy group or groups may be terminal, i.e.,

group or groups, or internal group or groups. Preferably all of the epoxy groups are internal groups. These groups may be in an open or closed chain portion of the molecule. The molecule is preferably aliphatic and free of substituents other than carbon, hydrogen, oxygen and chlorine.

Examples of these polyepoxides include the epoxy-substituted hydrocarbons, such as, for example, vinyl cyclohexene dioxide, 2,3,5,6-diepoxyoctane, 2,3,6,7-diepoxydodecane, 1,2-epoxy-3-(2,3-epoxypropyl)cyclohexane, 2,2-bis(epoxycyclohexyl)propane and 1,2-epoxy-4-(3,4-epoxybutyl)cyclohexane.

Other examples include the epoxidized esters of the polyethylenically unsaturated monocarboxylic acids, such as epoxidized linseed, soyabean, perilla, oiticia, tung, walnut and dehydrated caster oil, methyl linoleate, butyl linolenate, ethyl 9,12-octadecadienoate, butyl 9,12,15-octadecatrienoate, ethyl elaeostearate, octyl 9,12-octadecadienoate, methyl elaeostearate, monoglycerides of tung oil fatty acids, monoglycerides of soyabean oil sunflower, rapeseed, hempseed, sardine, cottonseed oil, and the like.

Another group of the epoxy-containing materials used in the process of the invention include the epoxidized esters of unsaturated monohydric alcohols and polycarboxylic acids, such as, for example, di(2,3-epoxybutyl) adipate, di(2,3-epoxybutyl) oxalate, di(2,3-epoxyhexyl) succinate, di(3,4-epoxybutyl) maleate, di(2,3-epoxyoctyl) pimelate, di(2,3-epoxybutyl) phthalate, di(2,3-epoxyoctyl) tetrahydrophthalate, di(4,5-epoxydodecyl) maleate, di(2,3-epoxybutyl) terephthalate, di(2,3-epoxypentyl) thiodipropionate, di(5,6-epoxytetradecyl) diphenyldicarboxylate, di(3,4-epoxyheptyl) sulfonyldibutyrate, tri(2,3-epoxybutyl) 1,2,4-butanetricarboxylate, di(5,6-epoxypentadecyl) tartrate, di(4,5-epoxytetradecyl) maleate, di(2,3-epoxybutyl) azelate, di(2,3-epoxybutyl) citrate, di(5,6-epoxyoctyl) cyclohexane-1,3-dicarboxylate, di(4,5-epoxyoctadecyl) malonate.

Another group of the epoxy-containing materials includes those epoxidized esters of unsaturated alcohols and unsaturated carboxylic acids, such as 2,3-epoxybutyl 3,4-epoxypentanoate, 3,4-epoxyhexyl 3,4-epoxypentanoate, epoxidized tetrahydrobenzyl tetrahydrobenzoate, 3,4-epoxycyclohexyl 3,4-cyclohexanoate, 3,4-epoxycyclohexyl 4,5-epoxyoctanoate, and the like.

Still another group of the epoxy-containing materials includes epoxidized derivatives of polyethylenically unsaturated polycarboxylic acids, such as, for example, dimethyl 8,9,12,13-diepoxyeicosanedioate, dibutyl 7,8,11,12-diepoxyoctadecanedioate, dioctyl 10,11-diethyl-8,9,12,13-diepoxy-eicosanedioate, dihexyl 6,7,10,11-diepoxyhexadecanedioate, didecyl 9-epoxy-ethyl-10,11-expoxyoctadecenedioate, dibutyl 3-butyl-3,4,5,6-diepoxycyclohexane-1,2-dicarboxylate, dicyclohexyl 3,4,5,6-diepoxycyclohexane-1,2-dicarboxylate, dibenzyl 1,2,4,5-diepoxycyclohexane-1,2-dicarboxylate and diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol, the polyester obtained by reacting diethylene glycol with 2-cyclohexene-1,4-dicarboxylic acid and the like, and mixtures thereof.

Another group comprises the epoxidized polymers and copolymers of diolefins, such as butadiene. Examples of this include, among others, butadiene-acrylonitrile copolymers (Hycar rubbers), butadiene styrene copolymers and the like.

Particularly preferred materials to be used according to the process of the invention comprise the epoxidized esters of polyethylenically unsaturated monocarboxylic acids containing not more than 22 carbon atoms, the epoxidized esters of polyethylenically unsaturated polycarboxylic acids containing not more than 25 carbon atoms, and the epoxidized esters of ethylenically unsaturated monohydric alcohols and ethylenically unsaturated carboxylic acids containing not more than 22 carbon atoms.

The above-described epoxy-containing materials are preferably obtained by epoxidizing the corresponding unsaturated compounds. Thus, the compounds such as dimethyl 8,9,12,13-diepoxy-eicosanedioate may be obtained by epoxidizing dimethyl 8,9,12,13-eicosadienedioate. The epoxidation may be accomplished by merely reacting the unsaturated compound with an epoxidizing agent. Organic peracids, such as performic, peracetic, perbenzoic acid, monoperphthalic acid and the like, are preferred agents for this reaction.

The amount of the epoxidizing agent employed will vary over a considerable range depending upon the type of product desired. In general, one should employ at least one mole of the oxidizing agent, such as perbenzoic acid, for every ethylenic group to be epoxidized. Thus to produce epoxidized dicrotyl adipate from dicrotyl adipate, one should react the unsaturated ester with at least two moles of perbenzoic acid. In some cases, it is rather to effect epoxidation of all of the ethylenic groups and if a completely epoxidized product is required, additional epoxidizing agent and/or longer reaction period may be required.

The temperature employed during the epoxidation may vary over a considerable range depending upon the type of reactants and epoxidizing agents selected. It is generally desirable to maintain the temperature between —20° C. to 100° C. Preferred temperatures range from about —10° C. to room temperature, e.g., about 20° C. Atmospheric, superatmospheric, or subatmospheric pressures may be employed as desired.

The epoxidized product obtained by this method may be recovered from the reaction mixture by any convenient means known to the art, such as distillation, extraction, fractional precipitation and the like.

The material to be used as the curing agent in the process of the invention comprises the halo-substituted polybasic acid anhydrides, and preferably the polychloro-substituted polycarboxylic acid anhydrides. The carboxylic acids used in the formation of the anhydrides may be saturated, unsaturated, aliphatic, cycloaliphatic, aromatic or heterocyclic. Examples of these anhydrides include, among others, 3- and 4-chlorophthalic anhydride, 4-chloro-isophthalic anhydride, dichloro-hexahydrophthalic anhydride, 3,4,5,6,7,7-hexachloro-3,6-endomethylene 1,2,3,6-tetrahydrophthalic anhydride (chlorendic anhydride), dichloro succinic anhydride, dichloro maleic anhydride, chlorosuccinic anhydride, monochloromaleic anhydride, 6-chloro-4-cyclohexadiene-1,2-dicarboxylic acid anhydride, 3,6-dichloro-4-cyclohexadiene-1,2-dicarboxylic acid anhydride, 6-chloro-3,5-cyclohexadiene-1,2-dicarboxylic acid anhydride, chloro-octadecylsuccinic acid anhydride and chloro-pyromellitic anhydride.

Preferred anhydrides to be employed in the process comprise the chlorinated aliphatic, cycloaliphatic and aromatic mono- and dianhydrides (i.e., those possessing two of the above-noted anhydride groups such as pyromellitic anhydride) and still more preferably the di- to hexachlorinated derivatives of these anhydrides.

According to the process of the invention, the polyepoxide material containing the internal epoxy group is cured by admixing and reacting the material with above-described halo-substituted anhydrides. The amount of the anhydride to be used in the process will vary over a wide range. Good cures are obtained by reacting the polyepoxide with at least .8 equivalent of the anhydride. As used herein in relation to the amount of anhydride and polyepoxide, the expression "equivalent" amount refers to that amount of anhydride needed to furnish one anhydride group for every epoxy group in the polyepoxide to be involved in the cure. To obtain the best results, the anhydride should be employed in about at least a chemical equivalent amount, and more preferably in equivalent ratio of 1:1 to 1.5:1.

In executing the process of the invention, it is desirable to have the polyepoxide in a mobile liquid condition when the anhydrides are added in order to facilitate mixing. With those polyepoxides that are liquid, but too viscous for ready mixing, one may either heat to reduce viscosity, or have a liquid solvent added thereto in order to provide fluidity. Normally solid polyepoxides are likewise either melted or mixed with a liquid solvent. Various solvents are suitable for achieving the desired fluidity. They may be volatile solvents which escape from the polyepoxide composition containing the anhydride by evaporation before or during the curing, such as ketones like acetone, methyl ethyl ketone, methyl isobutyl ketone, isophorone, etc., esters such as ethyl acetate, butyl acetate, Cellosolve acetate (ethylene glycol monoacetate), methyl Cellosolve acetate (acetate of ethylene glycol monomethyl ether), etc.; ether alcohols, such as methyl, ethyl or butyl ether of ethylene glycol or diethylene glycol; chlorinated hydrocarbons such as trichloropropane, chloroform, etc. To save expense, these active solvents may be used in admixture with aromatic hydrocarbons, such as benzene, toluene, xylene, etc., and/or alcohols, such as ethyl, isopropyl or n-butyl alcohol. Solvents which remain in the cured composition may also be used, such as diethyl phthalate, dibutyl phthalate, or liquid monoepoxy compounds, including glycidyl allyl ether, glycidyl phenyl ether, styrene oxide, 1,2-hexylene oxide, glycide, and the like, as well as cyano-substituted hydrocarbons, such as acetonitrile, propionitrile, adiponitrile, benzonitrile, and the like. It is also convenient to employ the solid or semi-solid polyepoxides in combination with a liquid polyepoxide, such as a normally liquid glycidyl polyether of a polyhydric alcohol. Various other ingredients may be mixed with the polyepoxide composition including pigments, fillers, dyes, plasticizers, resins, and the like.

The cure may be effected over a wide range of temperatures. The cure may be accomplished, for example, by merely mixing the anhydride with the polyepoxide as indicated above and then letting the mixture stand at room temperature. In some applications, it may be desirable to effect a more rapid cure and this may be accomplished by raising the temperature. Excellent rates of cure are obtained at temperatures from 50° C. to 110° C. and these are preferred from many applications where heating is permissible. Temperatures much above 200° C. are generally not desirable but may be employed if necessary.

The curing agent-polyepoxide systems described above may be utilized for a great variety of important applications. They may be used, for example, in the preparation of coating compositions such as enamels and paints. In these applications, it is generally desirable to combine the polyepoxide with the anhydride and activator and desired solvents or other film-forming materials, and then apply this mixture to the surface to be coated. The coatings may then be allowed to set at room temperature or heat may be applied.

The systems described above are also very useful in the preparation of pottings and castings. They are particularly suitable for preparing very large castings as can be cured at low temperatures without liberation of large amounts of heat and this gives a more even cure which results in much stronger and more durable products. In this application, the mixture of polyepoxide, anhydride and activator alone or with suitable diluents is added to the desired mold or casting and then allowed to set at room temperature. Heat may be applied in some cases to hasten cure.

The above-described systems are also useful in the preparation of laminates. In this application, the sheets of fibrous materials are first impregnated with the mixture of polyepoxide and anhydride. This is conveniently accomplished by dissolving the anhydride in acetone and mixing the solution with the polyepoxide so as to obtain a fluid mixture. The sheets of fibrous material are impregnated with the mixture by spreading it thereon or by dipping or otherwise immersing them in the impregnant. The solvent is conveniently removed by evaporation and the mixture is cured to the fusible resin stage. Although this operation may be conducted at room temperature (20 to 25° C.), it is preferred to use somewhat elevated temperature such as about 50° C. to 200° C. with the impregnated sheet stock passing through or hanging free in an oven or other suitable equipment. The resinification is arrested before infusible product occurs by cooling below about 40° C. A plurality of the impregnated sheets are then superposed and the assembly is cured in a heat press under a pressure of about 25 to 500 or more pounds per square inch. The resulting laminate is extremely strong and resistant against the action of organic and corrosive solvents. The fibrous material used in the preparation of the laminates may be of any suitable material, such as glass cloth and matting, paper, asbestos paper, mica flakes, cotton bats, duck muslin, canvas, and the like. It is usually preferred to utilize woven glass cloth that has been given prior treatment with well known finishing or sizing agents therefor, such as chrome methacrylate or vinyl trichlorosilane.

In the above applications, the resulting cured products are characterized by their excellent hardness, durability and good water resistance.

To illustrate the manner in which the invention may be carried out, the following examples are given. It is to be understood, however, that the examples are for the purpose of illustration and the invention is not to be regarded as limited to any of the specific materials or conditions recited therein. Unless otherwise indicated, parts described in the examples are parts by weight.

Example I

This example illustrates the unexpected results obtained by treating epoxidized soyabean oil with chlorendic anhydride [1] as compared to the results obtained with known curing agents.

(a) 100 parts of epoxidized soyabean oil described above was mixed with the materials shown in the table below in the indicated amount. The mixtures were then heated at 125° C. for four hours. As indicated in the table, in most cases no noticeable change occurred and in the other cases the mixture set up only to a very soft gel.

| Curing Agent | PHR | Cure Obtained |
|---|---|---|
| Diethylene triamine | 10 | None. |
| 2,4,6-tri(dimethylaminoethyl) phenol | 10 | Do. |
| Diethylaminopropylamine | 10 | Do. |
| BF$_3$-triethanolamine | 1 | Do. |
| Citric Acid | 20 | Formed soft gel. |
| Hydrogenated dimer acids | 20 | None. |
| Phthalic anhydride | 40 | Do. |

[1] Hexachloroendomethylenetetrahydrophthalic anhydride.

(b) 100 parts of epoxidized soyabean oil described above was then mixed with an equivalent amount of chlorendic anhydride (46 parts) and the mixture placed in a metal cup and heated to 100° C. for 10 hours. The resulting product was a hard strong casting which could be bounced on the floor without breaking.

Example II

This example illustrates the unexpected improvement in cure obtained by treating epoxidized soyabean oil with a mixture of 3- and 4-chlorophthalic anhydride.

100 parts of epoxidized soyabean oil having the properties described in Example I was mixed with 70 parts of a mixture of 3- and 4-chlorophthalic anhydride and the mixture heated for several hours at 125° C.; the resulting product was a very hard product which could be bounced off the floor without breaking.

Example III

Example II was repeated with the exception that the mixture of 3- and 4-chlorophthalic anhydride was replaced by dichloromaleic anhydride. The product obtained in this case was also a hard strong casting which could be bounced on the floor without breaking.

Example IV

Example II was repeated with the exception that the mixture of 3- and 4-chlorophthalic anhydride was replaced by an equivalent amount of tetrachlorophthalic anhydride and the mixture heated to 150° C. The product obtained in this case was also a hard strong casting which could be bounced on the floor without breaking.

Example V

Example I(b) was repeated with the exception that the mixture of 3- and 4-chlorophthalic anhydride was replaced by an equivalent amount of monochloromaleic anhydride. The product obtained in this case was also a hard strong casting.

Example VI

This example illustrates the unexpected improvement in cure obtained by treating epoxidized soyabean oil with a mixture of chlorendic anhydride and chlorophthalic anhydride.

100 parts of epoxidized soyabean oil having the properties described in Example I was mixed with 99 parts of a mixture of anhydrides made up of 50 parts chlorendic anhydride and 50 parts of chlorophthalic anhydride was added thereto. This mixture was heated for four hours at 100° C. The resulting product was a hard strong casting.

Example VII

This example illustrates the unexpected improvement in cure obtained by treating epoxidized soyabean oil with a mixture of chlorendic anhydride and dichloromaleic anhydride.

15.9 parts of epoxidized soyabean oil having the properties described in Example I was mixed with 14.1 parts of a mixture of anhydrides made up of 50% chlorendic anhydride, and 50% dichloromaleic anhydride. This mixture was heated for 2 hours at 125° C. The resulting product was a hard strong casting which could be bounced on the floor without breaking.

Example VIII

This example illustrates the cure of epoxidized soyabean oil with a mixture of pyromellitic anhydride and chlorendic anhydride.

100 parts of an epoxidized soyabean oil having an epoxy value of 0.40 eq./100 g. was mixed with 10.0 parts of pyromellitic anhydride and 111 parts of chlorendic anhydride. The mixture was placed in an oven at about 115° C. The resulting product was a hard flexible casting.

Example IX

This example illustrates the cure of an epoxidized polyester of ethylene glycol and 8,12-eicosadienedioic acid with a mixture of chlorendic anhydride, chlorophthalic anhydride and hexahydrophthalic anhydride.

100 parts of an epoxidized polyester of ethylene glycol and 8,12-eicosadienedioic acid having an epoxy value of .237 eq./100 g. was heated with 52 parts of a mixture of anhydrides made up of 40% chlorendic anhydride, 40% chlorophthalic anhydride and 20% hexahydrophthalic anhydride. This mixture was heated at 100° C. The resulting product was a hard strong casting which could be bounced on the floor without breaking.

Example X

This example illustrates the cure of an epoxidized polyester of propylene glycol and tetrahydrophthalic anhydride with dichloromaleic anhydride.

100 parts of an epoxidized polyester of ethylene glycol and tetrahydrophthalic acid having an epoxy value of 0.178 eq./100 g. was heated with 30 parts of dichloromaleic anhydride at 125° C. The resulting casting had a Barcol hardness of 35.

Example XI

This example illustrates the cure of an epoxidized dicrotyl adipate (B.P. 170–174° C.) with chlorendic anhydride.

100 parts of epoxidized dicrotyl adipate was combined with 60 parts of chlorendic anhydride and the mixture heated to 100° C. The resulting casting was a hard flexible solid.

Related results are obtained by replacing the epoxidized dicrotyl adipate in the above process with equal amounts of epoxidized dicrotyl terephthalate, epoxidized dicrotyl phthalate, epoxidized dicrotyl isophthalate.

Example XII

This example illustrates the cure of epoxidized dicrotyl oxalate (M.P. 102–106° C.) with chlorendic anhydride.

100 parts of epoxidized dicrotyl oxalate was combined with 64 parts of chlorendic anhydride and the mixture heated to 100° C. for several hours. The resulting casting was a hard flexible solid.

Example XIII

This example illustrates the cure of epoxidized dimethyl 8,12-eicosadienedioate with chlorendic anhydride.

100 parts of epoxidized dimethyl 8,12-eicosadienedioate was combined with 64 parts of chlorendic anhydride. This mixture was then heated to 100° C. for several hours. The resulting product was a hard tough solid casting.

Related results are obtained by replacing the epoxidized dimethyl 8,12-eicosadienedioate in the above process with equal amounts of each of the following: epoxidized dimethyl ester of octadienedioic acid, the dibutyl ester of 4-methyl-1,4-cyclohexadiene-1,2-dicarboxylic acid and the dihexyl ester of octadecadienedioic acid.

Example XIV

This example illustrates the cure of epoxidized tetrahydrobenzyl tetrahydrobenzoate with tetrachlorophthalic anhydride.

100 parts of epoxidized tetrahydrobenzyl tetrahydrobenzoate having an epoxy value of .73 eq./100 g. was combined with 170 parts of tetrachlorophthalic anhydride and the mixture heated at 125° C. The resulting product was a hard solid casting.

Related results are obtained by replacing the epoxidized tetrahydrobenzyl tetrahydrobenzoate in the above process with equal amounts of epoxidized ditetrahydrobenzyl phthalate.

Example XV

This example illustrates the cure of epoxidized di(3-cyclohexenyl) propane with chlorendic anhydride.

100 parts of epoxidized dicyclohexenyl propane is combined with 50 parts of chlorendic anhydride and the mixture heated at 125° C. for several hours. The resulting product is a hard flexible casting.

Example XVI

This example illustrates the unexpected superior results obtained by treating epoxidized cyclohexenyl cyclohexenecarboxylate with a dichlorocyclohexanedicarboxylic acid anhydride.

About 100 parts of epoxidized cyclohexenyl cyclohexenecarboxylate was combined with 50 parts of dichlorocyclohexanedicarboxylic acid anhydride. In a short period, the mixture set up to form a very hard flexible casting.

Example XVII

This example illustrates the cure of epoxidized Hycar rubber (butadiene-acrylonitrile copolymer) with chlorendic anhydride.

About 100 parts of epoxidized Hycar rubber having an epoxy value of 0.234 eq./100 g. was combined with 70 parts of chlorendic anhydride and the mixture heated for four hours at 125° C. The resulting product is a hard rubbery product which could be bounced off the floor without breaking.

Related results are obtained by replacing the epoxidized Hycar rubber with an epoxidized half-hydrogenated polybutadiene having an epoxy value of 0.35 eq./100 g.

Example XVIII

This example illustrates the cure of epoxidized dicrotyl terephthalate with dichloromaleic anhydride.

100 parts of epoxidized dicrotyl terephthalate having an epoxy value of 0.61 eq./100 g. was combined with 60 parts of dichloromaleic anhydride and the mixture heated at 125° C. The mixture set up and formed a hard casting.

Example XIX

The process in the preceding example was repeated with the exception that the anhydride was chlorendic anhydride (242 parts) and the mixture was heated for 2 hours at 100° C. The product in this case was a hard solid having a Barcol hardness of 42 at room temperature.

Example XX

This example illustrates the cure of expoxidized dicrotyl phthalate with dichlorophthalic anhydride.

100 parts of epoxidized dicrotyl phthalate having an epoxy value of 0.60 eq./100 g. was combined with 100 parts of dichlorophthalic anhydride and the mixture heated at 125° C. In 1 hour, the mixture set up to form a hard casting having a Barcol hardness of 36 at room temperature.

Example XXI

The process in the preceding example was repeated with the exception that the anhydride was chlorendic anhydride (242 parts) and the mixture was heated for 2 hours at 100° C. The product in this case was a hard solid having a Barcol hardness of 44 at room temperature.

Example XXII

This example illustrates the cure of epoxidized dimethallyl 8,12-eicosadienedioate-1,20 with chlorendic anhydride.

100 parts of epoxidized dimethallyl 8,12-eicosadienedioate-1,20 having an epoxy value of 0.40 eq./100 g. was combined with 118 parts of chlorendic anhydride and the mixture heated at 125° C. The mixture gelled in 15 minutes and formed a hard flexible casting.

I claim as my invention:

1. A process for curing polyepoxide materials having at least one

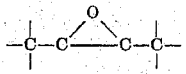

group and selected from the group consisting of epoxidized triglycerides, epoxidized esters of saturated monohydric alcohols and polyethylenically unsaturated polycarboxylic acids, epoxidized esters of ethylenically unsaturated monohydric alcohols and polycarboxylic acids, epoxidized esters of unsaturated alcohols and unsaturated monocarboxylic acids, all of the aforedescribed triglyceride and ester members of the group, before epoxidation, containing carbon-to-carbon unsaturated linkages only in internal positions to form hard products which consists of mixing and reacting the materials with at least .8 equivalents of polychlorinated polycarboxylic acid anhydride wherein "equivalent" refers to that amount required to furnish one carboxylic acid anhydride group per epoxy group.

2. A hard insoluble infusible product obtained by the process of claim 1.

3. A process as in claim 1 wherein the epoxidized material is an epoxidized triglyceride.

4. A process as in claim 1 wherein the epoxidized material is an epoxidized ester of a saturated monohydric alcohol and a polyethylenically unsaturated polycarboxylic acid.

5. A process as in claim 1 wherein the epoxidized material is an epoxidized dicrotyl ester of an aromatic dicarboxylic acid.

6. A process as in claim 1 wherein the anhydride is dichloromaleic anhydride.

7. A process as in claim 1 wherein the anhydride is polychlorinated phthalic anhydride.

8. A process as in claim 1 wherein the anhydride is hexachloroendomethylenetetrahydrophthalic anhydride.

9. A process as in claim 1 wherein the epoxidized triglyceride is epoxidized soyabean oil.

References Cited in the file of this patent

UNITED STATES PATENTS

| | | |
|---|---|---|
| 2,744,845 | Rudoff | May 8, 1956 |
| 2,768,153 | Shokal | Oct. 23, 1956 |